United States Patent
Grimm et al.

(10) Patent No.: US 8,300,564 B2
(45) Date of Patent: Oct. 30, 2012

(54) OPPORTUNISTIC DATA TRANSFER BETWEEN VEHICLES

(75) Inventors: Donald K. Grimm, Utica, MI (US); Fan Bai, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 352 days.

(21) Appl. No.: 12/712,358

(22) Filed: Feb. 25, 2010

(65) Prior Publication Data

US 2011/0205943 A1 Aug. 25, 2011

(51) Int. Cl.
*H04B 7/00* (2006.01)
(52) U.S. Cl. ........ 370/310; 370/252; 370/329; 370/466; 455/515
(58) Field of Classification Search .................. 370/310, 370/252, 329, 466; 455/515
See application file for complete search history.

(56) References Cited

U.S. PATENT DOCUMENTS

| | | | |
|---|---|---|---|
| 7,369,510 | B1 | 5/2008 | Wong |
| 2005/0249157 | A1* | 11/2005 | Qian et al. ............... 370/329 |
| 2008/0123639 | A1* | 5/2008 | Saito et al. ............... 370/389 |
| 2010/0246602 | A1* | 9/2010 | Barreto et al. ............. 370/466 |

FOREIGN PATENT DOCUMENTS

DE 10 2007 044 558 A1 1/2009

OTHER PUBLICATIONS

Feng, Kai-Ten et al. "Frame-Aggregated Link Adaptation Algorithm for IEEE 802.11n Networks" IEEE 2009, pp. 42-46.
Choudhury, Sayantan et al. "Payload Length and Rate Adaptation for Multimedia Communications in Wireless LANs" IEEE Journal on Selected areas in communications, vol. 25, No. 4, May 2007, pp. 796-807.
Wu, Dalei, et al. "Packet Size Optimization for Goodput Enhancement of Multi-Rate Wireless Networks" IEEE 2007, pp. 3578-3583.
Choudhury, Sayantan et al. "Payload Length and Rate Adaptation for Throughput Optimization in Wireless LANs" IEEE 2006, pp. 2444-2448.

* cited by examiner

*Primary Examiner* — Ricky Ngo
*Assistant Examiner* — Richard K Chang
(74) *Attorney, Agent, or Firm* — John A. Miller; Miller IP Group, PLC

(57) ABSTRACT

A system and method for optimizing wireless vehicle to vehicle communications is configured to maximize the amount of data that can be transferred from one vehicle to another during a transient encounter by adaptively adjusting the message packet size and data modulation rate during an inter-vehicle communication session.

17 Claims, 5 Drawing Sheets

OPPORTUNISTIC DATA TRANSFER BETWEEN VEHICLES

BACKGROUND

1. Field of the Invention

This invention relates generally to a system and method for optimizing wireless vehicle to vehicle communications and, more particularly, to a system and method configured to maximize the amount of data that can be transferred from one vehicle to another during a transient encounter by adaptively adjusting the message packet size and data communication rate during an inter-vehicle communication session.

2. Discussion of the Related Art

Traffic accidents and roadway congestion are significant problems for vehicle travel. Vehicular ad-hoc network based active control and driver assistance systems allow a short-range wireless vehicle communications system, such as a dedicated short range communication (DSRC) system or a WiFi-based wireless communication system, known to those skilled in the art, to transmit messages to other vehicles. DSRC or WiFi can be used to implement wireless-based vehicle features that can improve driver convenience, roadway efficiency, and facilitate many types of in-vehicle services. The DSRC technology enables a new class of vehicle features based on communication with other vehicles ("V2V") or the infrastructure ("V2I"). Broadly, the term "V2X" can be used to signify the various types of communication applications that are enabled by DSRC or WiFi in vehicular environments.

Vehicle-to-vehicle (V2V) and vehicle-to-infrastructure (V2I) applications require a minimum of one entity to send information to another entity. For example, many vehicle-to-vehicle applications can be executed on one vehicle by simply receiving broadcast messages from a neighboring vehicle. These broadcast messages are not directed to any specific vehicle, but are meant to be shared with a vehicle population. In these types of applications where collision avoidance is desirable, as two or more vehicles communicate to each other and a collision becomes probable, the vehicle systems can warn the vehicle drivers, or possibly take evasive action for the driver, such as applying the brakes. Likewise, traffic control units can observe the broadcast of information from passing vehicles and generate statistics on traffic flow through a given intersection or roadway.

In addition to providing advance notification of roadway events, DSRC or WiFi can also be used to exchange other types of information between vehicles (V2V) or between vehicles and roadway infrastructure (V2I). In such cases, vehicles could potentially download large amounts of data from another vehicle or from an infrastructure access point. Since vehicles are highly mobile, they will have limited opportunities to perform data transfer operations since the time period in which they are within communication range is likely to be limited. In an extreme case, two vehicles may pass each in the opposite direction while traveling at highway speeds. Given the limited encounter duration, it will be important to optimize the data throughput during the time window in which communication is possible.

Therefore, what is needed is a system and method to maximize the amount of data that can be transferred from one vehicle to another during a transient encounter.

SUMMARY

In accordance with the teachings of the present invention, a system and method are disclosed for optimizing data transferred between vehicles. The method includes determining if there are missed packets in a sequence of status messages transmitted between two vehicles, determining if a number of successful packet transfers is greater than or equal to a successful packets threshold and if a received signal strength indication is increasing, determining if a number of missed packet transfers is greater than or equal to a missed packets threshold and if a received signal strength indication is decreasing, increasing a length of a message packet by a predetermined packet increase amount if the number of successful packet transfers is greater than or equal to the successful packets threshold and if the received signal strength indication is increasing, and decreasing the length of the message packet by a predetermined packet decrease amount if the number of missed packet transfers is greater than or equal to the successful packets threshold and if the received signal strength indication is decreasing.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for optimizing the amount of data that can be transferred from one vehicle to another during a transient encounter is merely exemplary in nature, and is in no way intended to limit the invention or its applications or uses.

Figure 1:
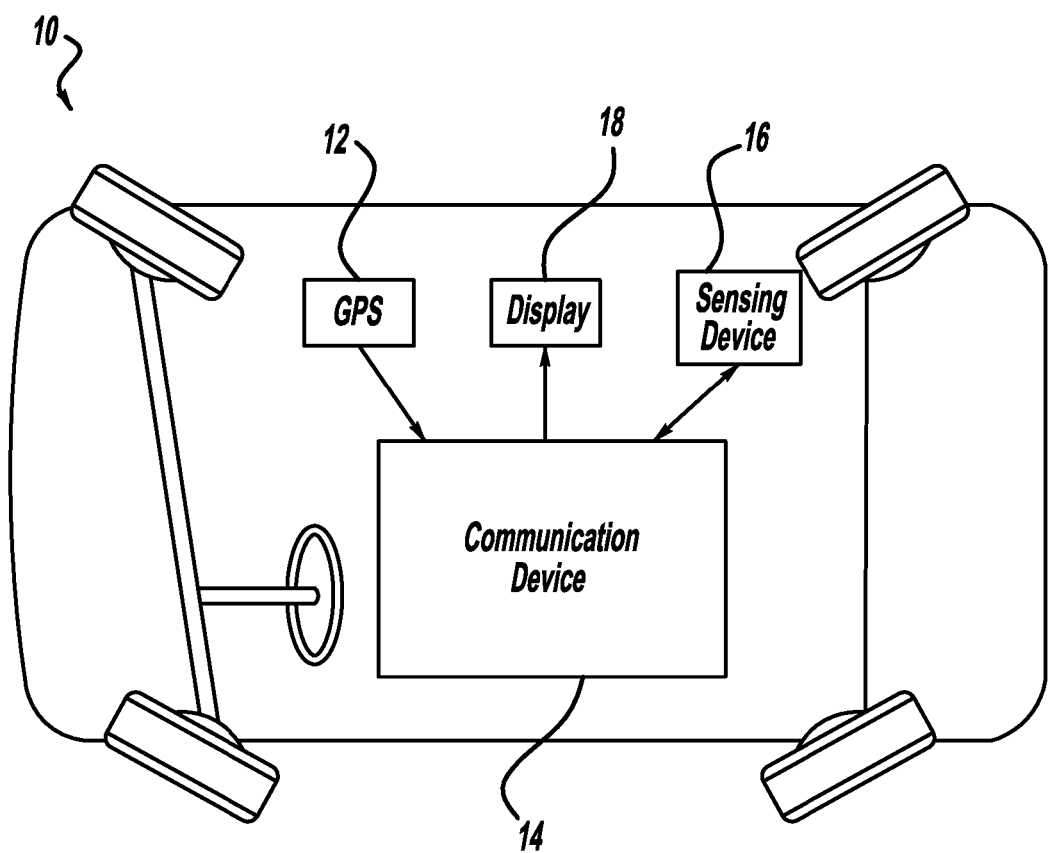
FIG. 1 is a plan view of a vehicle including a wireless communications system.

FIG. 1 is a representation of a vehicle 10 having a driver advisory system that includes a global positioning system device 12 (GPS) for establishing a global position of the driven vehicle, which is hereinafter referred to as a host vehicle. The host vehicle is in communication with a plurality of remote vehicles that are within a broadcast range of the host vehicle for exchanging information and data relating to, for example, global position, speed, and course heading data.

The system further includes a communications device 14 configured to employ a short-range vehicle communication system such as a dedicated short range communication (DSRC) system or a WiFi system. Alternatively, the device may include, but is not limited to, other types of wireless devices and networks such as cellular phones. The communications device 14 is further configured to exchange data between vehicles as part of a standard periodic beacon message that is broadcast in a vehicle-to-vehicle (V2V) communication system or a V2X communication system (i.e., vehicle to an infrastructure or other type of entity). The wireless message may include data relating to vehicle positions, vehicle kinematics/dynamic parameters, traffic or road events sensed by respective remote vehicles to forewarn drivers of nearby vehicles of some type of condition, traffic delays, accident, or current condition that could result in an accident. Data relating to a GPS determined position of the remote vehicle, the velocity at which the remote vehicle is traveling, and the course heading in which the remote vehicle traveling may be transmitted as part of the periodic beacon message from a remote vehicle. As understood by one of ordinary skill in the art, data may also include other types of information such as, but not limited to, telematics information, entertainment information (such as music or video) or other types of information relevant to vehicle drivers and passengers.

The driver advisory system 10 further includes a sensing device 16 such as a lidar, radar, vision and/or other object sensing mechanisms and a display device 18 configured to interface with the driver of the vehicle. The display device may include, but is not limited to, a visual display screen such as a navigation display screen or a heads-up-display projected on the windshield.

The system described herein optimizes the communication that occurs over the limited time window created by two passing vehicles by making communication adjustments based on the received signal strength and other types of channel feedback from remote communicating vehicles. Specifically, message packet sizes and data communication rates are adjusted in a manner to optimize message throughput for a set of receiving vehicles.

In one embodiment, an approach to optimizing the communication between vehicles involves varying message packet sizes based on signal strength and channel feedback under the assumption that larger packets have a higher probability of being dropped when channel conditions are poor. Packet drops can occur if communication is occurring over long distances, or if the channel experiences multi-path fading or shadowing effects. For example, in a system implementing IEEE 802.11p (DSRC), channel estimation begins at the beginning of the packet, but changes in the channel could cause channel equalization to expire before the end of the packet. Transmitting smaller message packets when the signal strength is weak, and larger message packets when the signal strength is strong, alleviates this risk and can improve the packet delivery ratio and result in an overall gain in throughput.

There are various approaches to optimizing packet sizes. One approach is an adaptive packet message algorithm that combines received signal strength indication (RSSI) and channel feedback. Channel feedback (such as MAC-layer beacon messages that arrive within a fixed interval, e.g., every one second) is obtained from periodic messages that are being received from remote vehicles. A minimum packet size is defined since packet sizes that fall below a certain value typically do not gain additional benefits due to the a small payload when compared to overall message size.

RSSI trend information can be used to predict an improved channel condition. In cases where a packet-missed threshold has been exceeded in the previous cycle, but the signal strength is improving, there is an increased probability that the same message size will go through during the next cycle. The RSSI trend can be calculated using the previous RSSI value, or can be sampled over time to determine a relative increase or decrease. From experimental results, a minimum packet size of 500 bytes has been found to work effectively when channel conditions are poor. The largest packet size is recommended to be set to the largest frame size supported by the IP protocol (e.g. 1500 bytes).

Figure 2:
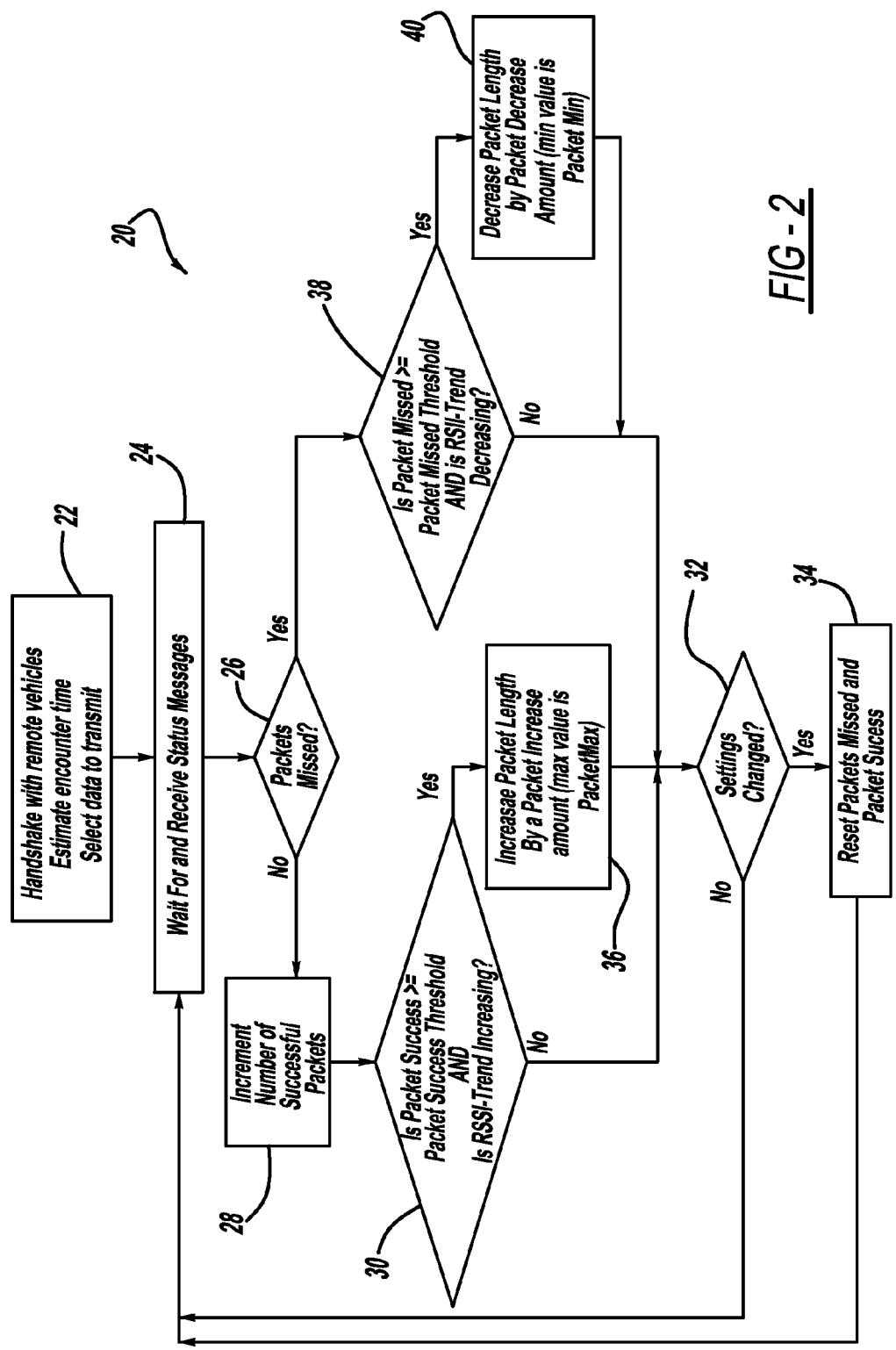
FIG. 2 illustrates an exemplary algorithm configured to optimize the communication between vehicles by varying message packet size, according to an embodiment.

FIG. 2 illustrates an exemplary algorithm 20 configured to optimize the communication between vehicles by varying message packet size. At step 22 a communication handshake occurs between the host vehicle and the remote vehicle wherein the host vehicle estimates the approximate encounter time and selects the data to transmit. At step 24 the host vehicle receives status messages from the remote vehicle. At step 26, algorithm 20 evaluates the packet sequence to determine if there are gaps in the transmission sequence indicating missed packets. If there are no missed packets, a successful packet counter is incremented at step 28. Next, algorithm 20 evaluates at step 30 whether the value of the successful packets counter is greater than or equal to a packet length success threshold and whether the RSSI trend value is increasing. If either of these two conditions is not met, algorithm 20 determines at step 32 whether any settings have been changed. If so, at step 34 the registers associated with a packet missed counter and the successful packets counter are reset and the process returns to step 24. If no settings have been changed, the process returns to step 24.

Returning to step 30, if the value of the successful packets counter is greater than or equal to a packet length success threshold and the RSSI trend value is increasing, the message packet length is increased at step 36 by an amount equal to a predetermined packet increase length. However, the length of the packet should not exceed a packet length maximum. After the length of the packet is increased, algorithm 20 determines if the settings have been changed at step 32, and as set forth above, either returns to step 24 or resets the missed packet and successful packets counter, then returns to step 24.

Returning to step 26, if there are missed packets in the status message sequence identified in step 24, then a packet missed counter is evaluated at step 38 to determine if the value of the counter exceeds a packet length missed threshold and if the RSSI is decreasing. If either of these two conditions is not met, algorithm 20 determines at step 32 whether any settings have been changed. If so, at step 34 the registers associated with a packet missed counter and the successful packets counter are reset and the process returns to step 24. If no settings have been changed, the process returns to step 24.

Returning to step 38, if the value of the missed packets counter is greater than or equal to the packet length missed threshold and if the RSSI is decreasing, then the packet length is decreased at step 40 by an amount equal to a predetermined packet decrease length. However, the length of the packet should not fall below a packet length minimum. After the length of the packet is decreased, algorithm 20 determines if the settings have been changed at step 32, and as set forth above, either returns to step 24 or resets the missed packet and successful packets counter, then returns to step 24.

Another approach to optimizing the communication between vehicles includes an adaptive data modulation rate optimization that increases network throughput by adaptively tuning the data modulation rate according to the channel conditions. For example, when communicating vehicles are far apart, it is unlikely that the channel is robust enough to support a large data modulation rate. However, as the distance between vehicles decreases and channel conditions improve, there is an opportunity for increased data modulation rates. Table 1, shown below, illustrates the modulation schemes and coding rates that are used for each data modulation rate using IEEE 802.11p. It has been shown in research literature that QAM modulation is more sensitive to noise than either BPSK or QPSK modulation schemes. Therefore, higher data modulation rates that use QAM modulation should only be used when channel conditions are good. Similar observations are made for other types of short-range wireless communication technology such as WiFi.

TABLE 1

Data Modulation Rates in IEEE 802.11p

| Data Rate | Modulation | Coding Rate |
|---|---|---|
| 3 Mbps | BPSK | 1/2 |
| 4.5 Mbps | BPSK | 3/4 |
| 6 Mbps | QPSK | 1/2 |
| 9 Mbps | QPSK | 3/4 |
| 12 Mbps | 16-QAM | 1/2 |
| 18 Mbps | 16-QAM | 3/4 |
| 24 Mbps | 64-QAM | 2/3 |
| 27 Mbps | 64-QAM | 3/4 |

Figure 3:
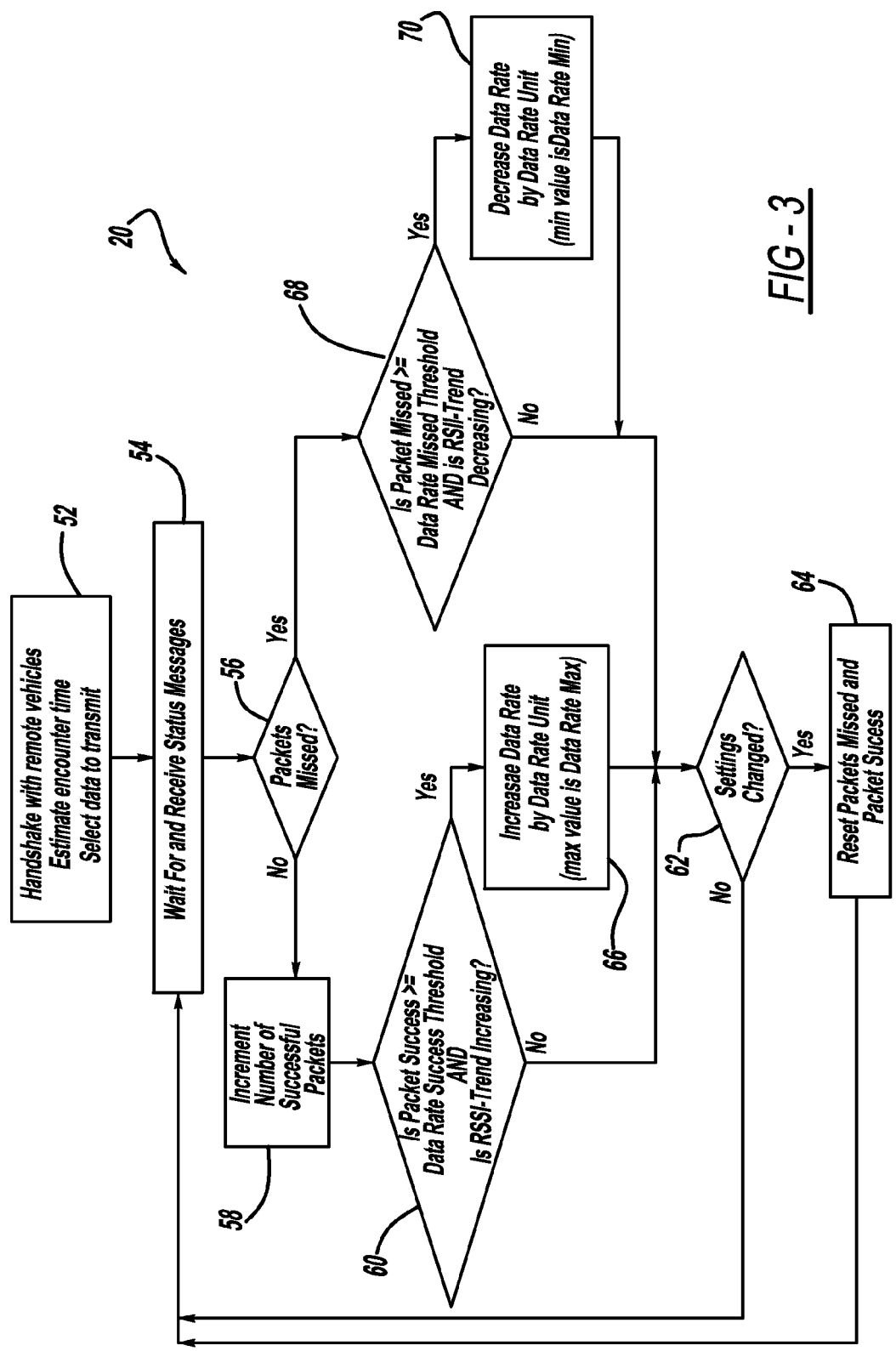
FIG. 3 illustrates an exemplary algorithm configured to optimize the communication between vehicles by the varying data modulation rate of the packet transmission, according to an embodiment.

FIG. 3 illustrates an exemplary algorithm 50 configured to optimize the communication between vehicles by the varying data modulation rate of the packet transmission. At step 52 a communication handshake occurs between the host vehicle and the remote vehicle wherein the host vehicle estimates the approximate encounter time and selects the data to transmit. At step 54 the host vehicle receives status messages from the remote vehicle. At step 56, algorithm 50 evaluates the packet sequence to determine if there are gaps in the transmission sequence indicating missed packets. If there are no missed packets, a successful packet counter is incremented at step 58. Next, algorithm 50 evaluates at step 60 whether the value of the successful packets counter is greater than or equal to a datarate success threshold and whether the RSSI trend value is increasing. If either of these two conditions is not met, algorithm 50 determines at step 62 whether any settings have been changed. If so, at step 64 the registers associated with a packet missed counter and the successful packets counter are reset and the process returns to step 54. If no settings have been changed, the process returns to step 54.

Returning to step 60, if the value of the successful packets counter is greater than or equal to a data rate success threshold and the RSSI trend value is increasing, the data modulation rate is increased at step 66 by an amount equal to a predetermined data rate unit. However, the data modulation rate of the packet should not exceed a packet data modulation rate maximum. After the transmission rate of the packet is increased, algorithm 50 determines if the settings have been changed at step 52, and as set forth above, either returns to step 54 or resets the missed packet and successful packets counter, then returns to step 54.

Returning to step 56, if there are missed packets in the status message sequence identified in step 54, then a packet missed counter is evaluated at step 68 to determine if the value of the counter exceeds a data rate missed threshold and if the RSSI is decreasing. If either of these two conditions is not met, algorithm 50 determines at step 62 whether any settings have been changed. If so, at step 64 the registers associated with a packet missed counter and the successful packets counter are reset and the process returns to step 54. If no settings have been changed, the process returns to step 54.

Returning to step 68, if the value of the missed packets counter is greater than or equal to the data rate missed threshold and if the RSSI is decreasing, then the data modulation rate is decreased at step 70 by an amount equal to a predetermined data rate unit. However, data modulation rate of the packet should not fall below a data modulation rate minimum. After the transmission rate of the packet is decreased, algorithm 50 determines if the settings have been changed at step 52, and as set forth above, either returns to step 54 or resets the missed packet and successful packets counter, then returns to step 54.

Another approach includes combining algorithms 20 and 50 to gain the performance benefits of varying both message packet size and data modulation rates. This hybrid approach yields the optimal performance by capitalizing on the strengths of both approaches. However, one of ordinary skill in the art understands that an algorithm directed to only one of the message packet size approach or the data modulation rate approach may also be used.

Figure 4A:
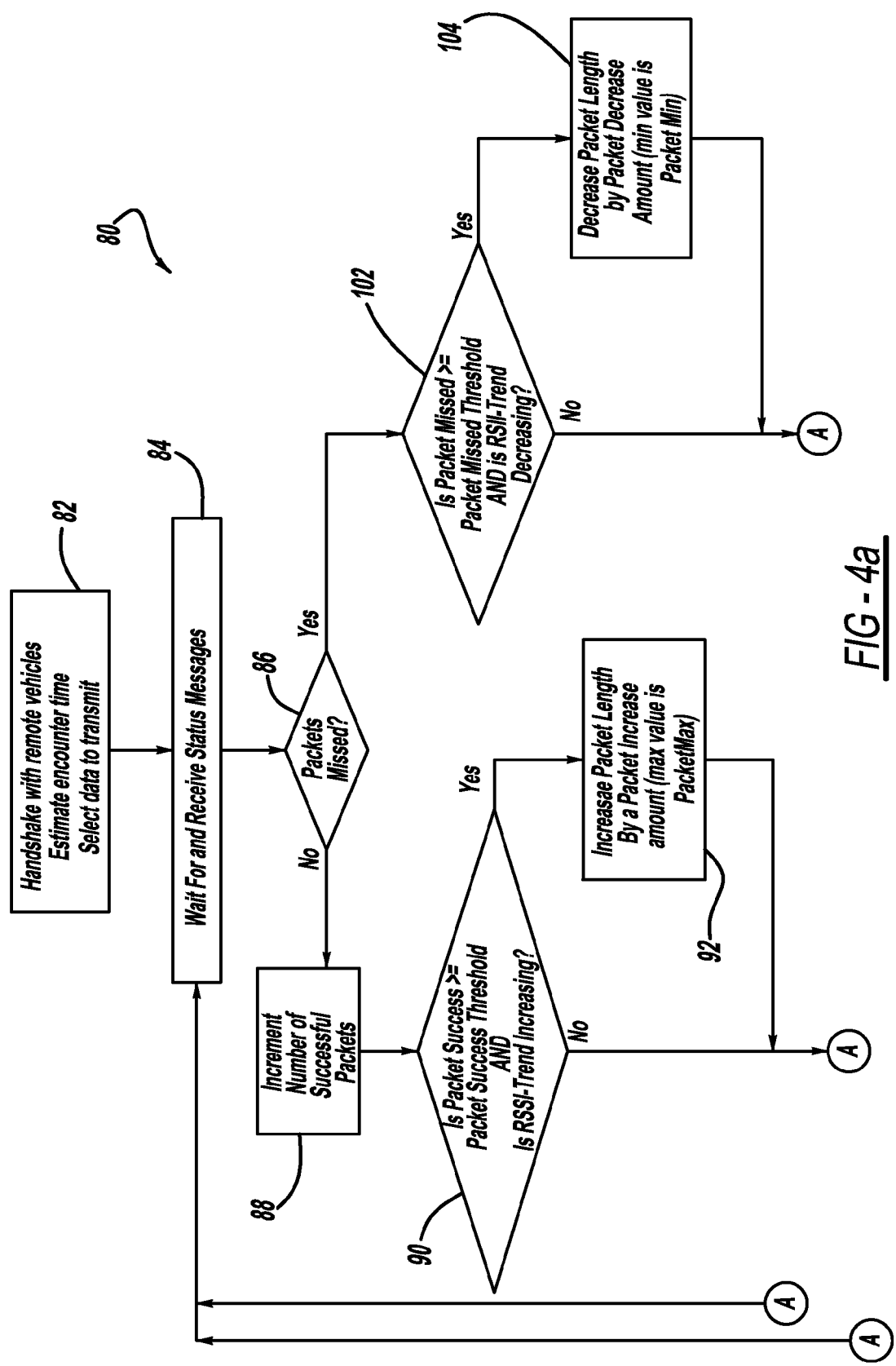
FIG. 4 illustrates an exemplary algorithm for adaptively modifying both message packet sizes and data modulation rates, according to an embodiment.
Figure 4B:
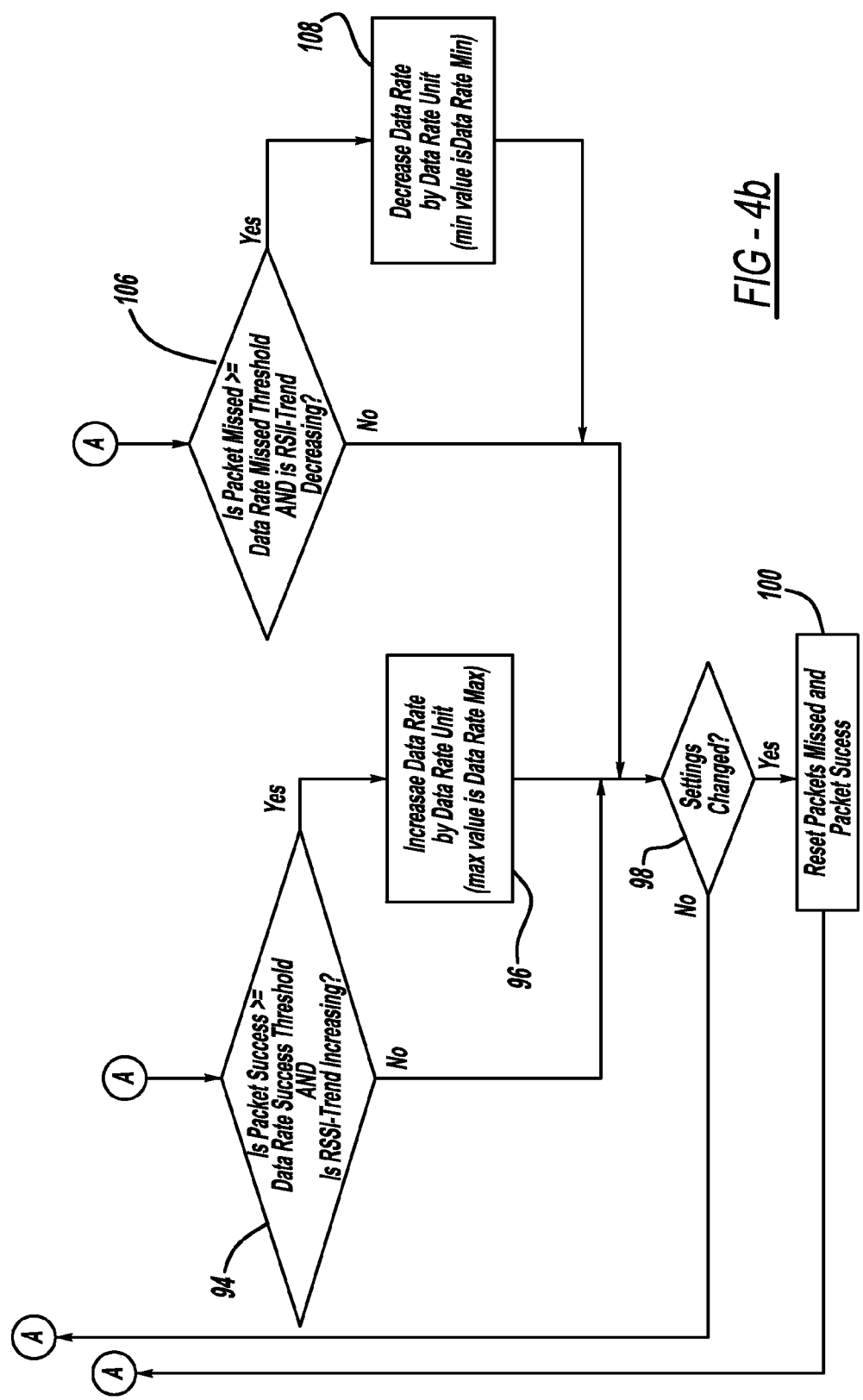

FIG. 4 illustrates an exemplary algorithm 80 for adaptively modifying both message packet sizes and data modulation rates. At step 82 a communication handshake occurs between the host vehicle and the remote vehicle wherein the host vehicle estimates the approximate encounter time and selects the data to transmit. At step 84 the host vehicle receives status messages from the remote vehicle. At step 86, algorithm 80 evaluates the packet sequence to determine if there are gaps in the transmission sequence indicating missed packets. If there are no missed packets, a successful packet counter is incremented at step 88. Next, algorithm 80 evaluates at step 90 whether the value of the successful packets counter is greater than or equal to a packet length success threshold and whether the RSSI trend value is increasing. If both conditions are met, the message packet length is increased at step 92 by an amount equal to a predetermined packet increase length. However, the length of the packet should not exceed a packet length maximum.

If either of these two conditions is not met, or after the length of the packet is increased at step 92, algorithm 80 determines at step 94 whether the value of the successful packets counter is greater than or equal to a data rate success threshold and whether the RSSI trend value is increasing. If both these conditions are met, the data modulation rate is increased at step 96 by an amount equal to a predetermined data rate unit. However, the data modulation rate of the packet should not exceed a packet data modulation rate maximum.

If either of the two conditions at step 94 is not met, or after the data modulation rate of the packet is increased at step 96, algorithm 80 determines at step 98 whether any settings have been changed. If so, at step 100 the registers associated with a packet missed counter and the successful packets counter are reset and the process returns to step 84. If no settings have been changed, the process returns to step 84.

Returning to step 86, if there are missed packets in the status message sequence identified in step 84, then a packet missed counter is evaluated at step 102 to determine if the value of the packet missed counter exceeds a packet length missed threshold and if the RSSI is decreasing. If both of these conditions are met, then the packet length is decreased at step 104 by an amount equal to a predetermined packet decrease length. However, the length of the packet should not fall below a packet length minimum. If either of these two conditions is not met, or after the length of the packet is decreased at step 104, algorithm 80 evaluates the packet missed counter at step 106 to determine if the value of the counter exceeds a data rate missed threshold and if the RSSI is decreasing. If both of these conditions are met, then the data modulation rate is decreased at step 108 by an amount equal to a predetermined data rate unit. However, data modulation rate of the packet should not fall below a data modulation rate minimum. If either of the two conditions at step 106 is not met, or after the data modulation rate of the packet is decreased at step 108, algorithm 80 determines if the settings have been changed at step 98, and as set forth above, either returns to step 84 or resets the missed packet and successful packets counter, then returns to step 84.

System 10 may be implemented on one or more suitable computing devices, which generally include applications that may be software applications tangibly embodied as a set of computer-executable instructions on a computer readable medium within the computing device. The computing device may be any one of a number of computing devices, such as a personal computer, processor, handheld computing device, etc.

Computing devices generally each include instructions executable by one or more devices such as those listed above. Computer-executable instructions may be compiled or interpreted from computer programs created using a variety of programming languages and/or technologies, including without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable media includes any medium that participates in providing data (e.g., instructions), which may be read by a computing device such as a computer. Such a medium may take many forms, including, but not limited to, non-volatile media, volatile media, and transmission media. Non-volatile media includes, for example, optical or magnetic disks and other persistent memory. Volatile media include dynamic random access memory (DRAM), which typically constitutes a main memory. Common forms of computer-readable media include any medium from which a computer can read.

It is to be understood that the above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that further developments will occur in the arts discussed herein, and that the disclosed systems and methods will be incorporated into such further examples. In sum, it should be understood that the invention is capable of modification and variation and is limited only by the following claims.

The present embodiments have been particular shown and described, which are merely illustrative of the best modes. It should be understood by those skilled in the art that various alternatives to the embodiments described herein may be employed in practicing the claims without departing from the spirit and scope of the invention and that the method and system within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable construction and their ordinary meaning as understood by those skilled in the art unless an explicit indication to the contrary is made herein. In particular, use of the singular articles such as "a", "the", "said", etc. should be read to recite one or more of the indicated elements unless a claim recites an explicit limitation to the contrary.

What is claimed is:

1. A method for optimizing data transferred between vehicles, said method comprising:
   determining if there are missed packets in a sequence of status messages transmitted between two vehicles;
   determining if a number of successful packet transfers is greater than or equal to a successful packets threshold and if a received signal strength indication is increasing, if there are no missed packets in the sequence of messages;
   determining if a number of missed packet transfers is greater than or equal to a missed packets threshold and if a received signal strength indication is decreasing, if there are missed packets in the sequence of messages;
   increasing a length of a message packet by a predetermined packet increase amount if the number of successful packet transfers is greater than or equal to the successful packets threshold and if the received signal strength indication is increasing;
   decreasing the length of the message packet by a predetermined packet decrease amount if the number of missed packet transfers is greater than or equal to the successful packets threshold and if the received signal strength indication is decreasing; and
   resetting the number of missed packet transfers and the number of successful packet transfers if packet settings have changed.

2. The method according to claim 1 further comprising incrementing the number of successful packet transfers if there are no missed packets in the sequence of messages.

3. The method according to claim 1 further including determining if the number of successful packet transfers is greater than or equal to a data rate success threshold and if the received signal strength indication is increasing, if there are no missed packets in the sequence of messages.

4. The method according to claim 1 further including determining if the number of missed packet transfers is greater than or equal to a data rate success threshold and if the received signal strength indication is decreasing, if there are missed packets in the sequence of messages.

5. The method according to claim 1 further comprising communicating between a host vehicle and a remote vehicle wherein the host vehicle estimates an approximate encounter time with the remote vehicle and selects the data to transmit.

6. The method according to claim 3 further including increasing a packet transfer data rate by a predetermined data rate unit if the number of successful packet transfers is greater than or equal to the data rate success threshold and if the received signal strength indication is increasing.

7. The method according to claim 4 further including decreasing the packet transfer data rate by a predetermined data rate unit if the number of missed packet transfers is greater than or equal to the data rate success threshold and if the received signal strength indication is decreasing.

8. A method for optimizing data transferred between vehicles, said method comprising:
   determining if there are missed packets in a sequence of status messages transmitted between two vehicles;
   determining if a number of successful packet transfers is greater than or equal to a data rate success threshold and if the received signal strength indication is increasing, if there are no missed packets in the sequence of messages;
   determining if a number of missed packet transfers is greater than or equal to the data rate success threshold and if a received signal strength indication is decreasing, if there are missed packets in the sequence of messages;
   increasing a packet transfer data rate by a predetermined data rate unit if the number of successful packet transfers is greater than or equal to the data rate success threshold and if the received signal strength indication is increasing;

decreasing the packet transfer data rate by a predetermined data rate unit if the number of missed packet transfers is greater than or equal to the data rate success threshold and if the received signal strength indication is decreasing; and resetting the number of missed packet transfers and the number of successful packet transfers if packet settings have changed.

9. The method according to claim 8 further comprising incrementing the number of successful packet transfers if there are no missed packets in the sequence of messages.

10. The method according to claim 8 further comprising communicating between a host vehicle and a remote vehicle wherein the host vehicle estimates an approximate encounter time with the remote vehicle and selects the data to transmit.

11. A system having non-transitory computer-readable medium tangibly embodying computer-executable instructions for: using a computing device for:

determining if there are missed packets in a sequence of status messages transmitted between two vehicles;

determining if a number of successful packet transfers is greater than or equal to a successful packets threshold and if a received signal strength indication is increasing, if there are no missed packets in the sequence of messages;

determining if a number of missed packet transfers is greater than or equal to a missed packets threshold and if a received signal strength indication is decreasing, if there are missed packets in the sequence of messages;

increasing a length of a message packet by a predetermined packet increase amount if the number of successful packet transfers is greater than or equal to the successful packets threshold and if the received signal strength indication is increasing;

decreasing the length of the message packet by a predetermined packet decrease amount if the number of missed packet transfers is greater than or equal to the successful packets threshold and if the received signal strength indication is decreasing; and resetting the number of missed packet transfers and the number of successful packet transfers if packet settings have changed.

12. The system according to claim 11 further comprising incrementing the number of successful packet transfers if there are no missed packets in the sequence of messages.

13. The system according to claim 11 further including determining if the number of successful packet transfers is greater than or equal to a data rate success threshold and if the received signal strength indication is increasing, if there are no missed packets in the sequence of messages.

14. The system according to claim 11 further including determining if the number of missed packet transfers is greater than or equal to a data rate success threshold and if the received signal strength indication is decreasing, if there are missed packets in the sequence of messages.

15. The system according to claim 11 further comprising communicating between a host vehicle and a remote vehicle wherein the host vehicle estimates an approximate encounter time with the remote vehicle and selects the data to transmit.

16. The system according to claim 13 further including increasing a packet transfer data rate by a predetermined data rate unit if the number of successful packet transfers is greater than or equal to the data rate success threshold and if the received signal strength indication is increasing.

17. The system according to claim 14 further including decreasing the packet transfer data rate by a predetermined data rate unit if the number of missed packet transfers is greater than or equal to the data rate success threshold and if the received signal strength indication is decreasing.

* * * * *